(12) United States Patent
Parham et al.

(10) Patent No.: US 7,860,662 B2
(45) Date of Patent: Dec. 28, 2010

(54) SYSTEMS AND METHODS FOR DETERMINING FILTER SERVICE LIVES

(75) Inventors: Michael Parham, Matthews, NC (US); Yuquing Ding, Charlotte, NC (US)

(73) Assignee: Scott Technologies, Inc., Boca Raton, FL (US)

( * ) Notice: Subject to any disclaimer, the term of this patent is extended or adjusted under 35 U.S.C. 154(b) by 91 days.

(21) Appl. No.: 12/336,920

(22) Filed: Dec. 17, 2008

(65) Prior Publication Data

US 2010/0153023 A1 Jun. 17, 2010

(51) Int. Cl.
*G01B 3/44* (2006.01)

(52) U.S. Cl. .............. 702/34; 96/117; 128/202.22; 210/741

(58) Field of Classification Search ............ 702/17, 702/22, 33, 34, 35, 190; 96/117, 141, 135, 96/153; 128/202.22, 205.27, 206.12; 210/90, 210/741; 340/632; 73/168; 116/206
See application file for complete search history.

(56) References Cited

U.S. PATENT DOCUMENTS

| | | |
|---|---|---|
| 3,966,440 A | 6/1976 | Roberts |
| 4,146,887 A | 3/1979 | Magnante |
| 4,154,586 A | 5/1979 | Jones et al. |
| 4,155,358 A | 5/1979 | McAllister et al. |
| 4,237,726 A | 12/1980 | Beaumont et al. |
| 4,326,514 A | 4/1982 | Eian |
| 4,421,719 A | 12/1983 | Burleigh |
| 4,530,706 A | 7/1985 | Jones |
| 4,684,380 A | 8/1987 | Leichnitz |
| 4,796,467 A | 1/1989 | Burt et al. |
| 5,376,554 A | 12/1994 | Vo-Dinh |
| 5,512,882 A | 4/1996 | Stetter et al. |
| 5,659,296 A | 8/1997 | Debe et al. |
| 5,666,949 A | 9/1997 | Debe et al. |
| 5,685,895 A | 11/1997 | Hagiwara et al. |
| 5,976,881 A | 11/1999 | Klingner |

(Continued)

FOREIGN PATENT DOCUMENTS

DE 10036270 A1 3/2001

OTHER PUBLICATIONS

International Search Report for International PCT Patent Application No. PCT/US2009/068363, mailed Mar. 19, 2010.

(Continued)

*Primary Examiner*—John H Le
(74) *Attorney, Agent, or Firm*—The Small Patent Law Group; Dean D. Small; Christopher R. Carroll (57) ABSTRACT

A method for determining a service life for a filter includes measuring exposure data and calculating a service life estimate based on the exposure data. The service life estimate is representative of an estimated exposure time that the filter is exposed to ambient conditions represented by the exposure data before the contaminant passes through the filter at a breakthrough concentration. The method also includes obtaining environmental data and establishing a predicted service life based on the environmental data. The predicted service life is representative of a predicted exposure time that the filter is exposed to the ambient conditions represented by the environmental data before the contaminant passes through the filter at the breakthrough concentration. The method further includes determining the service life for the filter based on a comparison of the estimated and predicted service lives.

29 Claims, 4 Drawing Sheets

U.S. PATENT DOCUMENTS

| | | | |
|---|---|---|---|
| 6,014,889 A | 1/2000 | Castor | |
| 6,040,777 A | 3/2000 | Ammann et al. | |
| 6,162,281 A | 12/2000 | Ammann et al. | |
| 6,186,140 B1 | 2/2001 | Hoague | |
| 6,375,725 B1 | 4/2002 | Bernard et al. | |
| 6,497,756 B1 | 12/2002 | Curado et al. | |
| 6,701,864 B2 | 3/2004 | Watson, Jr. et al. | |
| 6,736,980 B2 * | 5/2004 | Moscaritolo | 210/741 |
| 6,812,035 B1 | 11/2004 | Spitler et al. | |
| 7,442,237 B1 | 10/2008 | Gardner | |

OTHER PUBLICATIONS

"*Determination of End of Service Life Indciatory (ESLI) Test, Air-Purifying Respirators Standard Testing Procedure (STP)*", National Institute for Occupational Safety and Health, National Personal Protective Technology Laboratory, Sep. 12, 2005, 6 pgs.

Yuqing Ding, David Friday, Michael Parham, Greg Peterson; "*A Transient Breakthrough Model for Adsorptive Air Filters Application to ASZM-TEDA*", Scientific Conference on Chemical and Biological Defense Research Nov. 15, 2007, 17 pgs.

George Favas; "*End of Service Life Indicator (ESLI) for Respirator Cartridges. Part I: Literature Review*"; Human Protection & Performance Division Defence Science and Technology Organisation, Jul. 2005, 45 pgs.

\* cited by examiner

SYSTEMS AND METHODS FOR DETERMINING FILTER SERVICE LIVES

BACKGROUND OF THE INVENTION

This invention relates generally to systems and methods for determining the service life of air filters, and more particularly, for a system and method for calculating the service lives of filters for air purifying respirators.

Air purifying respirators ("APR"), including powered air purifying respirators ("PAPR") rely on filters to remove chemical contaminants from the air flow through the respirator and into an operator's airway. Known filters prevent or impede the passage of one or more chemical contaminants from the atmosphere surrounding the respirator into the operator's airway through the filter. The filters may be used to filter the chemical contaminants for a limited time. For example, known filters prevent chemical contaminants from passing through the filters at concentrations above a breakthrough concentration for a service life of the filter. The breakthrough concentration may be an upper safety threshold for inhalation of the contaminants. For example, the operator of the respirator may not safely inhale a contaminant at concentrations above the breakthrough concentration without a significant increase in the risk of injury or illness from the contaminant. The service life of a filter may represent a predetermined time period that the filter may be exposed to the contaminants and prevent passage of the contaminants above the breakthrough concentration.

The service lives of filters may be affected by ambient conditions. For example, varying temperatures, barometric pressures, humidity, contaminant concentrations, breathing rates, chemical contaminants, and the like may significantly shorten the service lives of filters. If the shortened service life of a filter is not accurately tracked or measured, the operator of the respirator faces an increased risk of harm by using a filter after the filter's service life has expired. In order to monitor changes to the service lives of filters, a change out schedule may be provided that lists how often a filter needs to be replaced when used in certain environments or under certain types of ambient conditions. The service lives provided by the change out schedules are predetermined and may not account for changes to the service lives during use of the filters. For example, the change out schedules may not dynamically adjust the expected service life of a filter when the filter is used in an environment where the ambient conditions may shorten the service lives of the filter during use of the filter.

Another method for monitoring changes to the service lives of filters includes providing end of service life indicators ("ELSI") on or with the filters. An ELSI includes a meter or other indication device that provides the operator of the respirator with a warning that the filter is about to expire. Known ELSIs may monitor concentrations of contaminants that are filtered by the respirator filters and, when the contaminant concentration increases above a threshold, an alarm is triggered to notify the operator that the filters need to be replaced. But, these known ELSIs suffer from many drawbacks, including the inability to factor in a variety of environmental factors into the determination of the end of the filter service life.

Thus, a need exists for a system and method for adaptively determining end of service lives for filters used in respirators based on the conditions under which the filters are used. The system and method should adapt the service life of the filter to the ambient conditions in which the filters are used to ensure that the operator of the respirator is provided sufficient time to replace the filter before the filter fails and permits unsafe levels of contaminants into the operator's airway.

BRIEF DESCRIPTION OF THE INVENTION

In one embodiment, a method for determining a service life for a filter is provided. The method includes measuring exposure data and calculating a service life estimate based on the exposure data. The service life estimate is representative of an estimated exposure time that the filter is exposed to ambient conditions represented by the exposure data before the contaminant passes through the filter at a breakthrough concentration. The method also includes obtaining environmental data and establishing a predicted service life based on the environmental data. The predicted service life is representative of a predicted exposure time that the filter is exposed to the ambient conditions represented by the environmental data before the contaminant passes through the filter at the breakthrough concentration. The method further includes determining the service life for the filter based on a comparison of the estimated and predicted service lives. Optionally, the service life may be representative of a time period that the filter prevents the contaminant from passing through the filter above the breakthrough concentration. The exposure data may be representative of one or more of the ambient conditions to which the filter is exposed. The environmental data may be representative of one or more of the ambient conditions and be obtained from an input that differs from the sensor.

In another embodiment, a computer-readable storage medium comprising one or more sets of instructions for determining a service life for a filter is provided. The instructions include instructions for receiving exposure data and environmental data and instructions for calculating a service life estimate based on the exposure data and a service life prediction based on the environmental data. The instructions also include instructions for determining the service life for the filter based on a comparison of the service life prediction and the service life estimate. Optionally, the instructions may also include instructions for calculating a residual life indicator based on the comparison of the service life prediction and the service life estimate, where the residual life indicator is representative of a remaining time period during which the filter is exposed to the ambient conditions before the chemical contaminant passes through the filter at the breakthrough concentration.

In another embodiment, a system for determining a service life for a filter is provided. The system includes a filter, a filter sensor and a monitoring module. The filter is configured to be coupled to an air purifying respirator to filter a contaminant. The sensor is disposed proximate to the filter to measure exposure data. The monitoring module receives the exposure data from the sensor and environmental data from an input that differs from the sensor. The monitoring module is configured to calculate a service life estimate based on the exposure data, establish a service life prediction based on the environmental data, and determine the service life for the filter based on a comparison of the service life prediction and the service life estimate. Optionally, the sensor is a plenum sensor disposed between two adsorbent beds in the filter.

DETAILED DESCRIPTION OF THE INVENTION

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It should be noted that although one or more embodiments may be described in connection air purifying respirators, the embodiments described herein are not limited to air purifying respirators. In particular, one or more embodiments may be implemented in connection with different types of filtration systems, including, for example, air filtration systems for buildings. Moreover, while one or more embodiments may be described as being implemented using one or more computer devices or systems, the embodiments described herein are not limited to computer-based systems and methods. Example embodiments of systems and methods for warning a user of a filter when one or more of a residual service life and an end of service life of the filter indicate that the filter needs to be replaced or that the user needs to move out of a toxic environment. A technical effect of one or more of the embodiments described herein includes adaptively determining at least one of the residual service life and the end of service life of a filter and warning an operator when the residual service life is close to being reached or the end of service life is being approached using one or more alarm devices, such as an audible, visual or tactile alarm.

Figure 1:
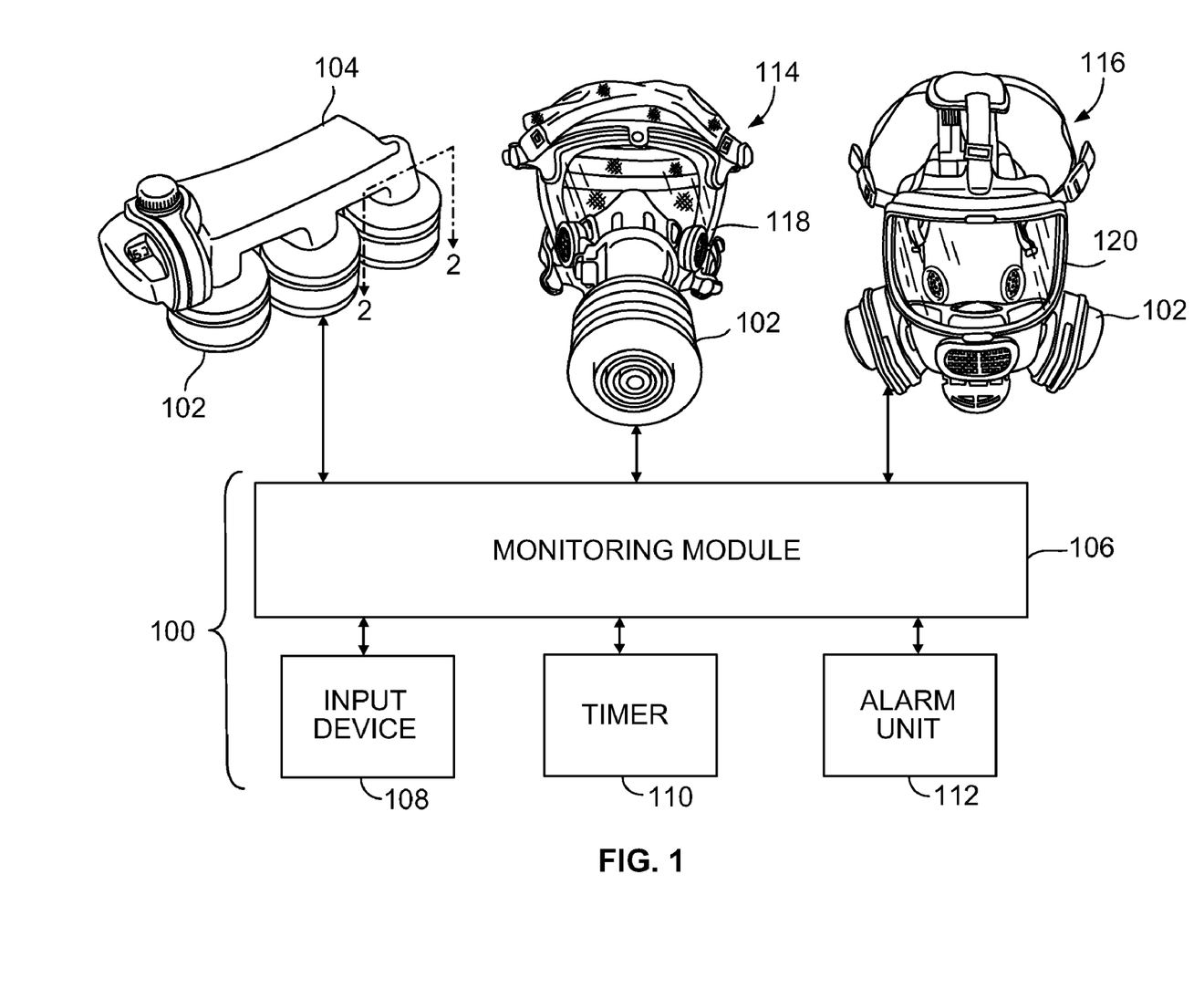
FIG. 1 is a schematic diagram of a system for adaptively determining an end of service life for a filter in accordance with one embodiment.

FIG. 1 is a schematic diagram of a system 100 for adaptively determining a residual service life ("RSL") and an end of service life ("ESL") for a filter 102 in accordance with one embodiment. The system 100 may communicate with a variety of different filters 102 that are joined to different respirators 104, 114, 116. For purposes of discussion only, the various filters 102 associated with the different respirators 104, 114, 116 are commonly referred to as a filter 102. The respirator 104 shown in FIG. 1 is a PAPR capable of being coupled to a mask. The respirator 114 is an APR having a full face mask 118 and the respirator 116 is a PAPR having a full face mask 120. The respirators 104, 114, 116 are provided merely as examples. The respirators 104, 114, 116 are worn by an operator to filter out chemical contaminants from a flow of air to the operator. For example, the operator breathes air through the filters 102 into the respirators 104, 114, 116 and into the operator's lungs. The filters 102 prevent chemical contaminants from being inhaled by the operator. The chemical contaminants may include any of several chemical species and compounds that are harmful to the operator when inhaled.

Each of the filters 102 may be capable of filtering one or more chemical contaminants for the service life of the corresponding filter. The service life for each filter 102 may be the amount of time that each filter 102 prevents one or more chemical contaminants from passing through the filter 102 at a concentration at or above a breakthrough concentration. The breakthrough concentration may be a limit on the contaminant concentration that may be safely inhaled by the operator. For example, each filter 102 may be capable of preventing vaporous mercury (Hg) from passing through the filter 102 at unsafe concentrations for 100 minutes of use.

The filters 102 include one or more sensors 212, 214, 216 (shown in FIG. 2) that measure exposure data. Exposure data is information or data representative of one or more ambient conditions to which the filter 102 is exposed. For example, the exposure data measured by the sensors 212, 214, 216 may include a concentration of the chemical contaminant being filtered by the filter 102, a measurement of a water concentration to which the filter 102 is exposed, a pressure, a temperature, a concentration of one or more other contaminants or chemical species, and the like. The water concentration may be a humidity measurement of the environment that surrounds the filter 102. The pressure may be a measurement of the barometric pressure. The exposure data may represent the current values of the parameters represented by the exposure data. For example, the exposure data may represent the current temperature, current pressure and current contaminant concentration to which the filter 102 is exposed during use.

Figure 2:
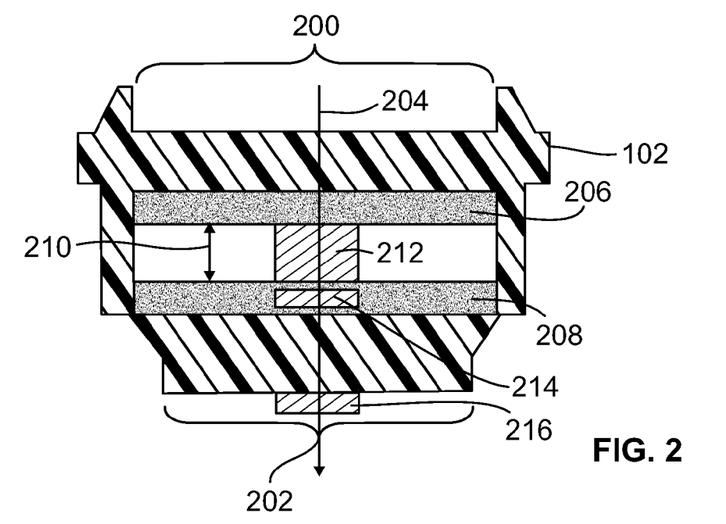
FIG. 2 is a schematic diagram of a cross-sectional view of the filter shown in FIG. 1 taken along line 2-2 in FIG. 1.

FIG. 2 is a schematic diagram of a cross-sectional view of the filter 102 taken along line 2-2 in FIG. 1. The filter 102 shown in FIGS. 1 and 2 is provided merely as an example of one filter. Other filters may be used in accordance with one or more embodiments described herein. By way of example only, a cylindrical filter, radial filter, split axial radial flow filter, conical filter, spherical filter, and the like, may be used as the filter 102. The filter 102 includes an inlet port 200 opposed by an outlet port 202. As the operator of the filter 102 breathes, air is drawn through the filter 102 in the direction indicated by the arrow 204. The filter 102 includes two or more filter bed layers 206, 208 separated by a gap 210. The filter bed layers 206, 208 include one or more adsorbent materials that adsorb various chemical contaminants drawn into the filter 102 as the operator breathes. Various types of filter media substrates may be represented by the filter bed layers 206, 208. By way of example only, the filter bed layers 206, 208 may represent packed bed granular media substrates, powered filter media, fibrous filter media, monolithic filter media substrates, and the like. The filter bed layers 206, 208 remove the chemical contaminants from the air flow through the filter 102 until the filter 102 approaches or reaches the end of the service life for the filter 102. At that point, the concentration of one or more chemical contaminants that pass through the outlet port 202 to the operator may increase to or above the breakthrough concentration of the filter 102. The gap 210 between the filter bed layers 206, 208 may be referred to as a plenum.

A first sensor 212 may be provided in the gap 210. The first sensor 212 alternatively may be referred to as a plenum sensor. A second sensor 214 may be provided in the lower filter bed layer 208. A third sensor 216 may be provided outside of the filter 102 proximate to the outlet port 202. Additional sensors may be provided in other locations proximate to the filter 102. For example, one or more other sensors may be located at or near the inlet port 200, at or near the outlet port 202, within the upper filter bed layer 206, and the like. Alternatively, less than all of the sensors 212, 214, 216 may be provided. The sensors 212, 214, 216 may measure the exposure data. For example, the sensors 212, 214, 216 may measure the concentration of one or more chemical contaminants. The first sensor 212 may measure the contaminant concentration to provide an indication of how much of the chemical contaminant is passing through the upper filter bed layer 206. The second sensor 214 may measure the contaminant concentration in the lower filter bed layer 208. The third sensor 216 may measure the contaminant concentration that is passing through the filter 102 through the outlet port 202. In one embodiment, the third sensor 216 may be capable of measuring relatively low concentrations of the chemical contaminant in order to determine how much of the contaminant is breaking through the filter 102 and reaching the operator.

Returning to the discussion of FIG. 1, the exposure data may include information unrelated to ambient conditions. For example, the exposure data may include information related to the filter 102. The filter-related information may include the location of one or more of the sensors 212, 214, 216 (shown in FIG. 2) in or around the filter 102. The filter-related information may include the properties of the filter, such as the adsorbent materials included in the filter 102, the packing density of the adsorbent materials in the filter 102, additional materials in the filter 102, the arrangement of the materials with respect to one another in the filter 102, and the like. Alternatively, the filter-related information may be a filter part number. The filter part number may then be used with a lookup table, for example, to obtain properties of the filter 102.

A monitoring module 106 is communicatively coupled to the filters 102. The system 100 may be physically separate from the filter 102 or filters 102 with which the system 100 communicates. For example, the system 100 may be provided on or coupled to the mask 118 or 120. Affixing the system 100 to the mask 118, 120 rather than to the filter 102 may reduce the cost of providing the functionality of the system 100 to users of the respirators 104, 114, 116 as the typically less expensive filters 102 may be disposed of repeatedly and re-used with the same system 100. The monitoring module 106 may wirelessly communicate with the sensors 212, 214, 216 (shown in FIG. 2) in one or more of the filters 102. Optionally, the monitoring module 106 may communicate with the sensors 212, 214, 216 using a wired connection. For example, the monitoring module 106 may be mounted to the respirator 104, 114, 116 and hard wired with the sensors 212, 214, 216. The monitoring module 106 receives the exposure data from one or more the sensors 212, 214, 216. In one embodiment, the monitoring module 106 receives, as exposure data, values for some of the ambient conditions and preset values for other ones of the ambient conditions. The preset values represent default values for one or more of the ambient conditions. In one example, the preset values may represent worst case values for some of the ambient conditions. The worst case values include values for one or more of the ambient conditions that would result in the shorter service lives for the filters 102 when compared to other values for the ambient conditions. For example, some filters 102 may have shorter service lives when the filters 102 are used in ambient conditions having extremely high temperatures or high concentrations of chemical contaminants. Predetermined values of ambient temperature, contaminant concentration, pressure, water concentration, and the like, may be communicated to the monitoring module 106 in place of measured values of the ambient conditions. The worst case values of the ambient conditions may be communicated to the monitoring module 106 in order to avoid overestimating or calculating the service lives of the filters 102.

An input device 108 is communicatively coupled to the monitoring module 106. The input device 108 includes a device, apparatus, or system capable of receiving environmental data and communicating the environmental data to the monitoring module 106. The environmental data includes values of one or more of the ambient conditions described above. The environmental data may include values of one or more ambient conditions other than those described above. For example, the input device 108 may communicate an air flow through the filters 102, a contaminant identity, a contaminant exposure, a humidity exposure, and the like. The air flow may represent a rate of air passage through the filter 102. For example, the air flow may be characterized as the work rate of the operator of the respirator 104, 114, 116 or the blower air flow rate of the blower (not shown) in a PAPR that includes the respirator 104, 114, 116 and filters 102. The contaminant identity may represent the chemical species or compound(s) that are filtered by the filters 102. The contaminant exposure may represent a previous chemical contaminant exposure that is a value of a total amount of a chemical contaminant that the filter 102 previously has been exposed. For example, the contaminant exposure may be calculated based on the history of the filter 102. Historical measurements of the contaminant concentrations to which the filter 102 has been exposed may be integrated with respect to time to determine the previous chemical contaminant exposure for the filter 102. The humidity exposure may represent a previous humidity exposure that is a value of a total amount of water that the filter 102 previously has been exposed. For example, the humidity exposure may be calculated by integrating historical measurements of the humidity or water concentrations to which the filter 102 has been exposed with respect to time. The environmental data may include an indication of the type of respirator to which the filters 102 are coupled. For example, the environmental data may include an indication as to whether the filters 102 are used in conjunction with an APR or a PAPR. The environmental data may include predetermined information associated with the type of respirator with which the filters 102 are used. For example, the environmental data may include a predetermined air flow through the filter 102 when the filter 102 is used with an APR or a predetermined air flow through the filter 102 when the filter 102 is used with a PAPR.

In one embodiment, the environmental data represents predetermined values for one or more of the ambient conditions. For example, the environmental data may be generated from a user and input to the monitoring module 106 using the input device 108. In another example, the environmental data may include default values for one or more of the ambient conditions described above. For example, the environmental data may not be directly measured by the input device 108.

The input device 108 may be embodied in a variety of devices. For example, the input device 108 may include a computing device having a microprocessor, such as a laptop or desktop computer having a keyboard, microphone, stylus, or other device capable of receiving input from a user. In one embodiment, the input device 108 may include a microprocessor running a software program capable of determining one or more of the ambient conditions based on input from a user. The user may select a desired service life of the filter 102 or a desired breakthrough concentration for a particular chemical contaminant on a software program operated by the input device 108. The input device 108 may calculate some of the ambient conditions required for the desired service life or desired breakthrough concentration input by the user. Alternatively, the input device 108 may communicate default values for the ambient conditions that are stored in a memory of the input device 108. In another example, the input device 108 includes a radio-frequency identification ("RFID") scanner that is capable of scanning an RFID tag to obtain the environmental data. For example, the input device 108 may be scan an RFID tag affixed to the filter 102, packaging that houses the filter 102 prior to coupling the filter 102 to the respirator 104, 114, 116, and the like. One or more predetermined values for the ambient conditions may then be communicated as environmental data from the input device 108 to the monitoring module 106. In another embodiment, the input device 108 may include a sensor (not shown) that determines values for one or more of the ambient conditions. For example, the input device 108 may include sensors similar to one or more of the sensors 212, 214, 216 (shown in FIG. 2) to obtain values for the ambient conditions and communicate the values as the environmental data to the monitoring module 106.

In one embodiment, the monitoring module 106 determines a residual service life and an end of service life for the filter 102. The residual service life may be a measurement of the capacity of the filter 102 to remove one or more toxins from the airflow through the filter 102. For example, the residual service life may be indicative of the residual life of the filter 102 that is reduced by exposure of the filter 103 to humidity, chemical contaminants, and the like. The residual service life may be based on conditions such as humidity, chemical contaminants, and the like, that may not directly harm an operator of the filter 102, but that degrade the residual life of the filter 102. The residual life of the filter 102 includes the time period during which the filter 102 has the capacity to filter out chemical contaminants from the airflow through the filter 102. The end of service life for the filter 102 may be indicative of the service life of the filter 102 that is based on current conditions. For example, the end of service life for the filter 102 may be based on the rate of exposure of the filter 102 to chemical contaminants and the current detection of contaminants at one or more of the sensors 212, 214, 216. As described below, the monitoring module 106 calculates the residual service life and the end of service life to warn the operator of the filter 102 that the filter 102 needs to be replaced, or that the operator needs to get out of the area in which the filter 102 is used, before a dangerous concentration of chemical contaminants breaks through the filter 102.

In one embodiment, the monitoring module 106 receives the exposure data from the sensors 212, 214, 216 (shown in FIG. 2) and uses the exposure data to determine an indicator of the end of service life for the filter 102. This indicator may be referred to as a service life estimate, or estimated service life, of the filter 102. The service life estimate is representative of an estimated exposure time that the filter 102 may be exposed to the ambient conditions measured by the sensors 212, 214, 216 before the chemical contaminant breaks through the filter 102 at or above the breakthrough concentration. The service life estimate may be dynamically updated during use of the filter 102. For example, the monitoring module 106 may update the service life estimate of the filter 102 based on one or more changes in the ambient conditions.

The monitoring module 106 receives the environmental data from the input device 108 and uses the environmental data to determine an indicator of the residual life for the filter 102. This indicator may be referred to as a service life prediction, or predicted service life, of the filter 102. The service life prediction is representative of that the remaining capacity of the filter 102 to remove chemical contaminants from the airflow through the filter 102 before the chemical contaminant breaks through the filter 102 at the breakthrough concentration. The remaining capacity of the filter 102 may depend on factors such as the humidity and chemical contaminant concentration to which the filter 102 already has been exposed. In one embodiment, the monitoring module 106 does not dynamically update the service life prediction during use of the filter 102. As described below, the monitoring module 106 compares the service life estimate and service life prediction to determine a residual life indicator ("RLI") and an end of service life indicator ("ESLI") in one embodiment.

In one embodiment, the RLI indicates the amount of time remaining during which the filter 102 may be exposed to ambient conditions, including a chemical contaminant, before the chemical contaminant passes through the filter 102 at or above the breakthrough concentration. A filter 102 associated with a larger RLI may have more residual service life remaining when compared to a filter 102 associated with a smaller RLI. In one embodiment, the RLI represents a percentage or fraction of a predetermined service life of the filter 102. For example, an RLI with a value of 0.1 may represent that the residual life of the filter 102 is approximately 10% of the predetermined service life of the filter 102. By way of example only, the predetermined service life of the filter 102 may be obtained by referring to a change out schedule for the filter 102 that is established by an employer or a regulatory agency.

The ESLI may indicate how close the filter 102 is to the end of the service life for the filter 102. For example, the ESLI may be an indication of the total amount of time that the filter 102 has been exposed to the ambient conditions. A filter 102 associated with a larger ESLI may be closer to approaching the end of the service life of the filter 102 when compared to a filter 102 associated with a smaller ESLI. In one embodiment, the ESLI represents a percentage or fraction of a predetermined service life of the filter 102. For example, an ESLI with a value of 0.9 may represent that the filter 102 has reached within approximately 90% of the predetermined service life of the filter 102. If the filter 102 has a predetermined service life of 100 minutes and the ESLI is 0.9, then the ESLI may represent that the filter 102 has used approximately 90 minutes of the service life of the filter 102 and is within 10 minutes of reaching the end of service life for the filter 102.

The monitoring module 106 is communicatively coupled to a timer 110 and an alarm unit 112. The timer 110 measures the time period over which the filter 102 is exposed to the ambient conditions measured by one or more of the sensors 212, 214, 216 (shown in FIG. 2). For example, the timer 110 may track the total exposure time that represents the total amount of time the filter 102 is exposed to the ambient conditions measured by the sensors 212, 214, 216. The alarm unit 112 includes a device capable of providing an audible, visual and/or tactile alarm to the operator of the respirator 104, 114, 116. The timer 110 communicates the exposure time of the filter 102 to the monitoring module 106. The timer 110 may be disposed as a component of the system 100 that is separate from the monitoring module 106 or the timer 110 may be provided as a component of the monitoring module 106. The monitoring module 106 monitors the filter 102 to determine when the filter 102 has reached or is approaching the end of the service life for the filter 102 and needs to be replaced. For example, the monitoring module 106 may monitor the exposure time measured by the timer 110 and compare the exposure time to one or more of the RLI and the ELSI. The monitoring module 106 compares the exposure time to the RLI and/or ELSI to determine if the filter 102 needs to be replaced. If the comparison between the exposure time and the RLI and/or ELSI indicates that the filter 102 needs to be replaced or is approaching the end of the service life of the filter 102, the monitoring module 106 directs the alarm unit 112 to notify the operator of the respirator 104, 114, 116 and filters 102. Alternatively, the monitoring module 106 may compare the exposure time to the RLI to warn the operator of the filter 102 to evacuate the area. For example, the RLI may be used to warn the operator to evacuate the area before the capacity of the filter 102 has been wholly or substantially degraded. If the RLI indicates that the operator has less than a threshold amount of time before the capacity of the filter 102 has been fully degraded, the alarm unit 112 may notify the operator to replace the filter 102 or evacuate the area.

Figure 3:
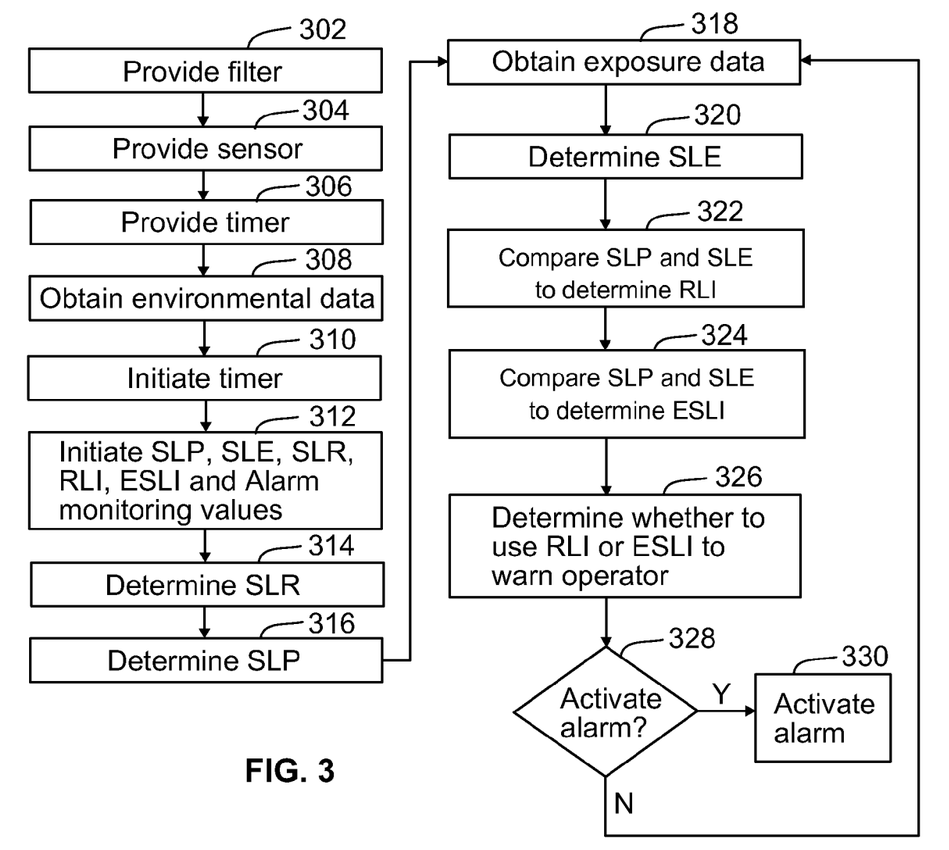
FIG. 3 illustrates a process for determining for a need to replace the filter shown in FIG. 1 according to one embodiment.

FIG. 3 illustrates a process 300 for adaptively determining a service life of a filter 102 (shown in FIG. 1) according to one embodiment. The service life may be the time at which the filter 102 needs to be replaced or that an operator of the filter 102 needs to get out of a toxic environment before a predetermined concentration of one or more chemical contaminants breaks through the filter 102. At 302, a filter is provided. For example, the filter 102 (shown in FIG. 1) may be provided. At 304, one or more sensors are provided. The sensors may be similar to the sensors 212, 214, 216 (shown in FIG. 2) and disposed in or proximate to the filter 102. At 306, a timer is provided. For example, the timer 110 (shown in FIG. 1) may be provided.

At 308, environmental data is obtained. As described above, the environmental data may include one or more ambient conditions input at the input device 108 (shown in FIG. 1). The environmental data may be user defined, predetermined, obtained by scanning an RFID tag, and the like, as described above. At 310, the timer is initiated. For example, the timer may be reset to an initial value of zero and begin measuring an elapsed amount of time at 310. The elapsed amount of time may indicate the total time that the filter 102 (shown in FIG. 1) is exposed to the ambient conditions, including one or more chemical contaminants.

At 312, the values of one or more monitoring indices are initiated. The monitoring indices represent various indicators of the end of service life for the filter 102 (shown in FIG. 1). In one embodiment, the monitoring indices that are initiated include one or more of the service life prediction ("SLP"), the service life estimate ("SLE"), a regulatory service life ("SLR"), the residual life indicator ("RLI"), and the end of service life indicator ("ESLI"). The monitoring indices may be initiated by setting the values of the indices in a memory to zero or to a predetermined value.

The regulatory service life may represent a predetermined service life of the filter 102. In one embodiment, the regulatory service life is at least partially based on one or more of the values input as the environmental data at 308. The regulatory service life may be obtained by comparing the environmental data with one or more standards established or published by an employer or a regulatory agency. For example, an employer or regulatory agency may publish a change out schedule for the filter 102 (shown in FIG. 1). The change out schedule may include a listing of one or more filters and corresponding end of service lives for the filters. The change out schedule may provide different end of service lives for a filter based on the ambient conditions to which the filter is to be exposed. For example, for one type of filter, the change out schedule may provide for longer end of service lives for filters that are exposed to lower temperatures, pressures, humidity levels, contaminant concentrations, and the like, than the end of service lives for filters that are exposed to higher temperatures, pressures, humidity levels, contaminant concentrations, and the like. While the regulatory service life of the filter 102 may be predetermined based on the environmental data, the regulatory service life of the filter 102 may change based on the usage of the filter 102. For example, if the filter 102 is exposed to the ambient conditions for a known amount of exposure time, the exposure time and one or more ambient conditions may be used to determine an updated regulatory service life of the filter 102 prior to using the filter 102 again.

At 314, the regulatory service life is determined. For example, the regulatory service life may be obtained from an employer change out schedule established under 29 C.F.R. §1910.134(d)(3)(iii)(B)(2) (2008). Alternatively, the regulatory service life may be obtained from a change out schedule established by a regulatory agency such as the Centers for Disease Control and Prevention, the Department of Health and Human Services, the National Institute for Occupational Safety and Health, the National Institutes of Health, the Occupational Safety and Health Administration, and the like. In one embodiment, the regulatory service life is determined by looking up the regulatory service life in one or more of a lookup table, database, and the like, stored in a memory. The table or database may include several regulatory service lives that are associated with different filters and ambient conditions. Based on the filter and the relevant ambient conditions, the table or database may provide a corresponding regulatory service life. Alternatively, the regulatory service life is based on a predetermined service life of the filter 102 (shown in FIG. 1) that is not obtained from an employer or regulatory change out schedule.

At 316, the service life prediction is determined. The service life prediction may be determined by calculating how long the filter 102 (shown in FIG. 1) may be exposed to the environmental data that is input to the monitoring module 106 (shown in FIG. 1) before one or more chemical contaminants pass through the filter 102 at a concentration that is at least as great as the breakthrough concentration. In one embodiment, the service life prediction is obtained by calculating an effluent concentration profile for the contaminant.

Figure 4:
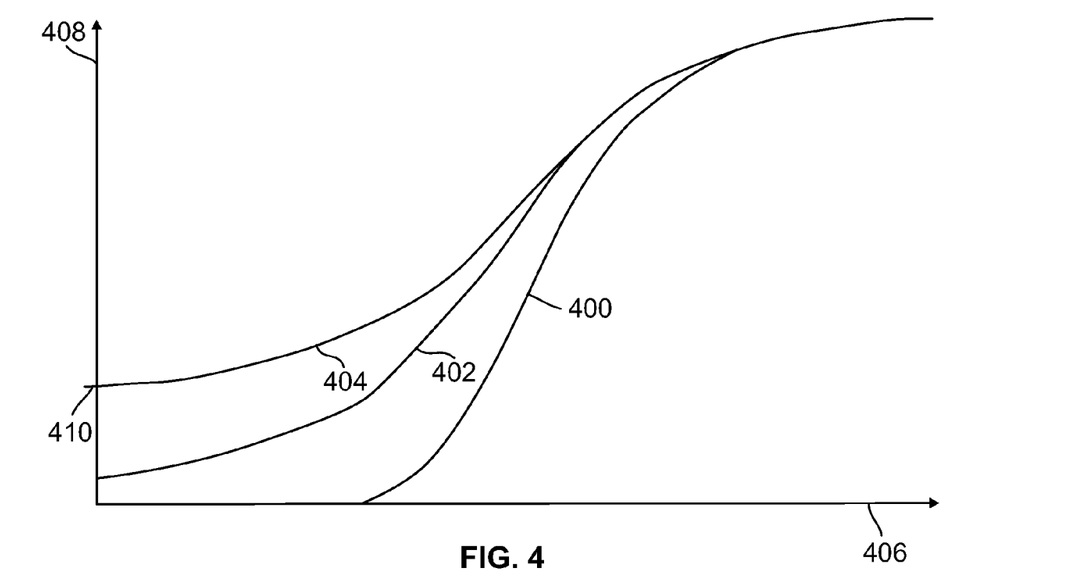
FIG. 4 is a graphical representation of example effluent concentration profiles.

FIG. 4 is a graphical representation of example effluent concentration profiles 400, 402, 404. A horizontal axis 406 represents a distance through the filter 102 (shown in FIG. 1). The horizontal axis 406 may represent the distance through one or both of the filter bed layers 206, 208 (shown in FIG. 2). For example, the left end of the horizontal axis 406 at the intersection of the horizontal axis 406 and a vertical axis 408 may represent a location in the filter 102 that is proximate to the outlet port 202 (shown in FIG. 2). The opposing right end of the horizontal axis 406 may represent a location in the filter that is proximate to the inlet port 200 (shown in FIG. 2). The vertical axis 408 represents a concentration of a contaminant in the filter 102. An example breakthrough concentration 410 on the vertical axis 408 represents a maximum allowable contaminant concentration at the outlet port 202. For example, contaminant concentrations at or above the breakthrough concentration 410 at the outlet port 202 may result in harm to the operator if the filter 102 continues to be used.

The effluent concentration profiles 400, 402, 404 represent the concentrations of the contaminant with respect to the location in the filter 102 after the filter 102 is exposed to the environmental factors for different amounts of time. For example, the first profile 400 represents the contaminant concentration with respect to position in the filter 102 after the filter 102 is exposed to the environmental data input into the monitoring module 106 for a first amount of time. The second profile 402 represents the contaminant concentration after the filter 102 is exposed to the environmental data for a second amount of time that is greater than the first amount of time. The third profile 402 represents the contaminant concentration in the filter 102 after a third amount of time that is greater than the second amount of time. Adjusting one or more of the input environmental data may adjust the shape of the effluent concentration profiles 400, 402, 404. For example, increasing the contaminant concentration, temperature, pressure or temperature that is input as the environmental data may change the shape of the effluent concentration profiles 400, 402, 404. The effluent concentration profiles 400, 402, 404 may be determined using one or more of the models described in U.S. patent application Ser. No. 12/177,358, entitled "Determining Effluent Concentration Profiles And Service Lives Of Air Purifying Respirator Cartridges" (referred to as the "'358 application"). The disclosure of the '358 application is incorporated by reference herein in its entirety. Alternatively, the effluent concentration profiles 400, 402, 404 may be determined using one or more different models.

As shown in FIG. 4, a greater concentration of the contaminant is predicted to pass through the filter 102 to the outlet port 202 (shown in FIG. 2) as the amount of time that the filter 102 increases. The service life prediction that is determined at 316 may be established by determining the amount of time that the filter 102 (shown in FIG. 1) may be exposed to the input environmental data before the contaminant concentration at the outlet port 202, or at the left end of the horizontal axis 406, reaches the predetermined breakthrough concentration 410. In one embodiment, the predicted service life may be determined using one or more of the models described in the '358 application. The predicted service life may be based on the environmental data and not on the exposure data measured by one or more of the sensors 212, 214, 216 (shown in FIG. 2) in one embodiment.

Returning to FIG. 3, at 318, exposure data is obtained. For example, one or more of the sensors 212, 214, 216 (shown in FIG. 2) may obtain exposure data and the exposure data may be communicated to the monitoring module 106 (shown in FIG. 1). At 320, a service life estimate is determined. The service life estimate may be determined by calculating one or more effluent concentration profiles based on the exposure data and establishing when the estimated contaminant concentration proximate to the outlet port 202 (shown in FIG. 2) of the filter 102 (shown in FIG. 1). For example, the service life estimate may be determined similar to the determination of the service life prediction described above, with the exception that the service life estimate may be based on the exposure data as opposed to the environmental data.

At 322, the service life prediction and the service life estimate are compared to determine the residual life indicator. In one embodiment, the residual life indicator is based at least in part on a comparison between a predetermined service life of the filter 102 (shown in FIG. 1) and the lesser of the service life prediction and the service life estimate. For example, the residual life indicator may be determined by establishing a service life index of the filter 102 (shown in FIG. 1) and then comparing the service life index of the filter 102 to the predetermined regulatory service life of the filter 102. For example, the service life index of the filter 102 may be established to be the lesser of the service life prediction and the service life estimate. The residual life indicator may then be calculated based on a relationship between the service life index and the regulatory service life of the filter 102. In one embodiment, the relationship between the service life index and the regulatory service life is based on the following equation:

$$RLI = SL/SLR \qquad (Eqn. 1)$$

where RLI represents the residual life indicator, SL represents the service life index of the filter 102, and the SLR represents the regulatory service life of the filter 102. The value of the residual life indicator may vary between 0 and 1. For example, if one or more of the service life prediction and the service life estimate is zero, then the residual life indicator may have a value of zero. The service life prediction or service life estimate may be zero when the environmental data or exposure data establishes that the contaminant concentration at the outlet port 200 (shown in FIG. 2) of the filter 102 is at least as great as the breakthrough concentration 410 (shown in FIG. 4). In another example, if the lesser of the service life prediction and service life estimate is at least as great as the regulatory service life, then the residual life indicator may have a value of one.

At 324, the service life prediction and the service life estimate are compared to determine the end of service life indicator. In one embodiment, the end of service life indicator is determined by establishing the service life index of the filter 102 (shown in FIG. 1) and then comparing the service life index to the regulatory service life of the filter 102. The service life index may be established as described above. The service life index is then compared to the regulatory service life of the filter 102 to determine an estimated end of service life. For example, the service life index and the regulatory service life may be compared to determine which is smaller. The estimated end of service life may be established to be the lesser of the service life index and the regulatory service life. The end of service life indicator is then determined by comparing the estimated end of service life to an exposure time of the filter 102. The exposure time may represent the elapsed amount of time that the filter 102 has been exposed to the ambient conditions. The exposure time may be measured by the timer 110 (shown in FIG. 1). Optionally, the exposure time may be a summed total of several previous time periods during which the filter 102 was exposed to the ambient conditions.

In one embodiment, the end of service life indicator is established by determining if the exposure time of the filter 102 (shown in FIG. 1) is at least as great as an end of service life threshold. The end of service life threshold may be an amount of time that is less than the estimated end of service life. For example, the end of service life threshold may be any of 90%, 80%, 75%, and the like, of the estimated end of service life. The end of service life threshold may be represented by the following:

$$ESLT = X*EESL \qquad (Eqn. 2)$$

where ESLT is the end of service life threshold, X is a predetermined coefficient, and EESL is the estimated end of service life. The predetermined coefficient X may be less than one. For example, the predetermined coefficient may be 0.9, 0.8, 0.7, and the like. If the exposure time of the filter 102 is at least as great as the end of service life threshold, then the filter 102 is determined to be approaching or at the end of the service life of the filter 102. For example, if the total exposure time of the filter 102 is found to be approaching or at least as great as the estimated end of service life of the filter 102, then the filter 102 may be considered to be at the end of the service life of the filter 102 and no longer safe to use in the ambient conditions. In one embodiment, the end of service life indicator is calculated to have a value of one when the total exposure time of the filter 102 is at least as great as the end of service life threshold. Alternatively, however, the end of service life indicator may be calculated or determined to have a different value that indicates that the filter 102 has reached the end of the service life of the filter 102.

On the other hand, if the exposure time of the filter 102 is less than the end of service life threshold, then the end of service life indicator may be established to be based on a relationship between the exposure time and the end of service life threshold. By way of example only, the end of service life indicator may be represented by a ratio between the exposure time and the end of service life threshold. One such ratio may include the following:

$$\text{ESLI} = t_{exp}/\text{ESLT} \quad \text{(Eqn. 3)}$$

where ESLI represents the end of service life indicator, $t_{exp}$ represents the exposure time, and ESLT represents the end of service life threshold. In one embodiment, the value of the end of service life indicator may range between zero and one.

At 326, a determination is made as to whether to use the residual life indicator or the end of service life indicator to warn an operator of the need to replace the filter 102. For example, the determination of whether to use the residual life indicator of the end of service life indicator may include determining which of the residual life indicator and the end of service life corresponds to a shorter end of service life for the filter. As described above, the residual life indicator and end of service life indicator may be compared to a predetermined service life of the filter 102 in order to determine an end of service life for the filter 102. If the predetermined service life of the filter 102 is 100 minutes and the residual life indicator is 0.1, then the residual life indicator may represent that approximately 10 minutes of the service life of the filter 102 remains before reaching the end of service life for the filter 102. If the end of service life indicator is 0.8, then the end of service life indicator may represent that the filter 102 has used approximately 80 minutes of the service life and that the filter 102 is within 20 minutes of the end of service life for the filter 102. Therefore, the residual service life indicator provides for a shorter end of service life for the filter 102 in this example. As a result, the residual service life indicator is used to warn an operator of the end of service life for the filter 102. Alternatively, if the end of service life indicator provides for a shorter end of service life for the filter 102, then the end of service life indicator is used.

In another embodiment, at 326, the residual life indicator and the end of service life indicator are compared by examining and comparing the values of the residual life indicator and the end of service life indicator. If the end of service life indicator has a value of one, or has a maximum value for the end of service life indicator, then it is determined that the end of service life indicator is used to warn the operator of the end of service life of the filter 102. If the end of service life indicator does not have a value of one, or does not have a value that is the maximum value of the end of service life indicator, then it is determined at 326 if a difference between a value of one and the residual life indicator is greater than the end of service life indicator. For example, if 1−RLI>ESLI, then it is determined at 326 that the residual life indicator is to be used to warn the operator of the end of service life of the filter 102. Alternatively, if 1−RLI is not greater than the end of service life indicator, then it is determined at 326 that the end of service life indicator is to be used to warn the operator.

At 328, a determination is made as to whether an alarm should be activated to warn an operator that a filter is at or is approaching the end of service life for the filter. For example, the determination may be made as to whether to activate the alarm unit 112 (shown in FIG. 1) to notify an operator that the filter 102 (shown in FIG. 1) is approaching or has reached the end of service life for the filter 102. In one embodiment, at 328, an end of service life for the filter 102 is calculated using the residual life indicator or the end of service life indicator, depending on the result of the determination made at 326. For example, if it is determined at 326 that the residual life indicator is to be used to warn the operator, then the end of service life is calculated using the residual life indicator. Alternatively, if it is determined at 326 that the end of service life indicator is to be used to warn the operator, then the end of service life is calculated using the end of service life indicator. The end of service life calculated using the residual life indicator or the end of service life indicator is then compared to the elapsed time that the filter has been exposed to the ambient conditions. For example, the end of service life may be compared to the elapsed exposure time measured by the timer 110 (shown in FIG. 1) to determine if the filter 102 has reached or exceeded the end of service life. In another embodiment, the elapsed exposure time is compared to a percentage or fraction of the end of service life to determine if the filter 102 is approaching the end of service life. For example, the elapsed exposure time may be compared to any of 90%, 80%, 70%, and the like, of the end of service life. If the filter 102 has reached or is approaching the end of service life, at 330, an alarm is activated. For example, the alarm unit 112 may be activated.

Alternatively, if the filter 102 has not reached or exceeded the end of service life, or is not approaching the end of service life, then the process 300 may proceed to 318 where an additional exposure data may be obtained, as described above. The process 300 may proceed in a loop-wise manner to repeatedly obtain updated exposure data and, if necessary, to adjust the service live estimate.

Optionally, the determination made at 328 may include examining the value of the end of service life indicator. If the end of service life indicator has a value of one, or a value above a predetermined threshold, then the alarm is activated at 330. The determination made at 328 may include examining the value of the residual life indicator. If the residual life indicator has a value of zero, or has a value that is less than a predetermined threshold, then the alarm is activated at 330.

Figure 5:
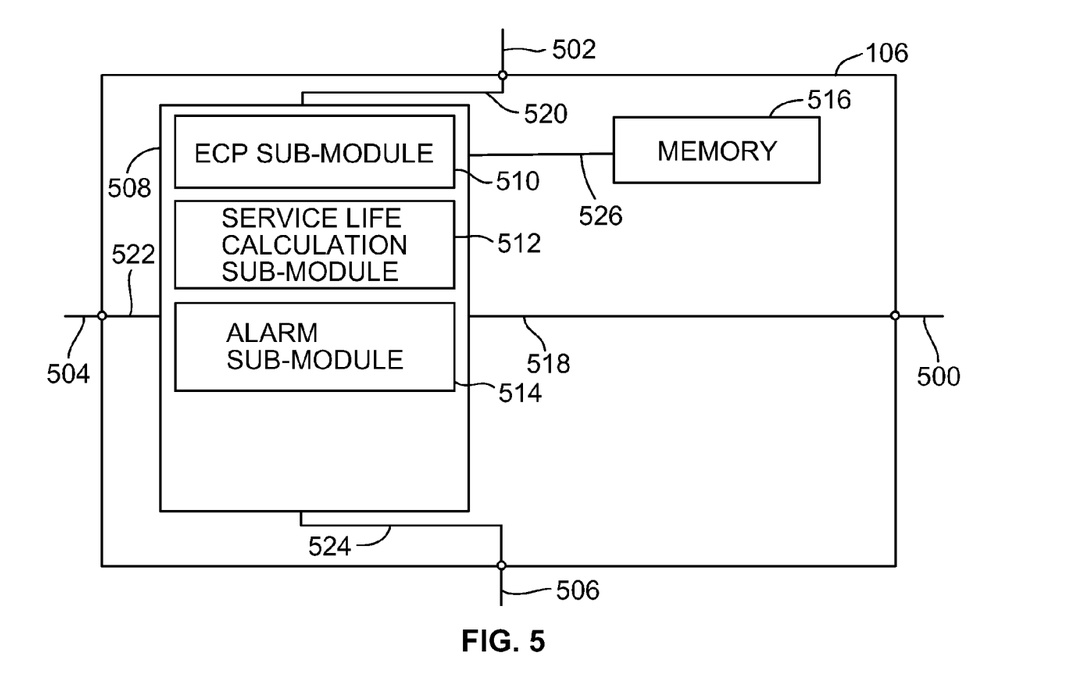
FIG. 5 is a schematic diagram of internal components of a monitoring module shown in FIG. 1 according to one embodiment.

FIG. 5 is a schematic diagram of internal components of the monitoring module 106 according to one embodiment. The monitoring module 106 is for illustration purposes only, and it is understood that the circuitry could be duplicated, eliminated or disabled in any desired combination to provide a device capable of receiving environmental data and exposure data and determining an end of service life for the filter 102. The monitoring module 106 may perform one or more of the operations described above in connection with the process 300 (shown in FIG. 3) alone or in concert with one or more additional components.

The monitoring module 106 includes one or more inputs 500, 502, 504, 506 that are capable of interfacing with one or more of the alarm unit 112 (shown in FIG. 1), the input device 108 (shown in FIG. 1), the timer 110 (shown in FIG. 1), and the sensors 212, 214, 216 (shown in FIG. 2). For example, the inputs 500, 502, 504, 506 may include connectors capable of establishing a communication pathway between the monitoring module 106 and one or more of the alarm unit 112, the input device 108 and the timer 110. Alternatively, one or more of the inputs 500, 502, 504, 506 may include an antenna or transceiver capable of wirelessly communicating with one or more of the alarm unit 112, the input device 108, the timer 110, and the sensors 212, 214, 216.

The monitoring module 106 includes a memory 516 and a programmable microcontroller 508. The memory 516 may be embodied in a computer-readable storage medium such as a ROM, RAM, flash memory, or other type of memory. The memory 516 may store data indicative of predetermined filter service lives, regulatory service lives, service life predictions, service life estimations, thresholds, estimated end of service lives, residual life indicators, end of service life indicators, breakthrough concentrations, and the like. The microcontroller 508 and memory 516 may be electrically coupled with one another and with one or more of the inputs 500-506 via one or more busses 518, 520, 522, 524, 526, for example. The monitoring module 106 is illustrated conceptually as a collection of sub-modules 510-514, but may be implemented utilizing any combination of dedicated hardware boards, DSPs, processors, etc. Alternatively, the monitoring module 106 and/or the sub-modules 510-514 may be implemented utilizing an off-the-shelf PC with a single processor or multiple processors, with the functional operations distributed between the processors. As a further option, the sub-modules 510-514 may be implemented utilizing a hybrid configuration in which certain modular functions are performed utilizing dedicated hardware, while the remaining modular functions are performed utilizing an off-the-shelf PC and the like. The sub-modules 510-514 also may be implemented as software modules within a processing unit. The sub-modules 510-514 are configured to perform one or more of the actions and determinations described above in connection with the process 300 (shown in FIG. 3). The sub-modules 510, 512, 514 may be combined or sub-divided into other sub-modules.

The effluent concentration profile ("ECP") sub-module 510 receives environmental data and exposure data (described above) and determines effluent concentration profiles such as the profiles 400-404 (shown in FIG. 4). For example, the ECP sub-module 510 may receive the environmental data and the exposure data and calculate one or more effluent concentration profiles based on the data and one or more mathematical models for calculating the effluent concentration profiles. In one embodiment, the ECP sub-module 510 obtains one or more default values for any parameters or variables required by the mathematical model to generate an effluent concentration profile that are not provided by the environmental and/or exposure data.

The service life calculation sub-module 512 determines or obtains one or more of the service life prediction, the service life estimate, the predetermined or regulatory service life, the residual life indicator, the end of service life indicator, the estimated end of service life, the end of service life threshold, the service life estimate, and the like, as described above. For example, the service life calculation sub-module 512 may obtain a breakthrough concentration from the memory 516 and compare the breakthrough concentration to one or more of the effluent concentration profiles generated by the ECP sub-module 510 to determine the service life prediction and the service life estimation, as described above. In another example, the service life calculation sub-module 512 may determine the predetermined or regulatory service life by accessing a lookup table or formula from the memory 516 to determine the regulatory service life of the filter 102 (shown in FIG. 1), as described above.

The alarm sub-module 514 determines whether to activate the alarm unit 112 (shown in FIG. 1). For example, the alarm sub-module 514 may examine the residual life indicator and the end of service life indicator to determine which of the indicators to use and apply the corresponding indicator to activate the alarm unit 112 when the filter 102 (shown in FIG. 1) is approaching or has reach the end of service life for the filter 102, as described above.

Figure 6:
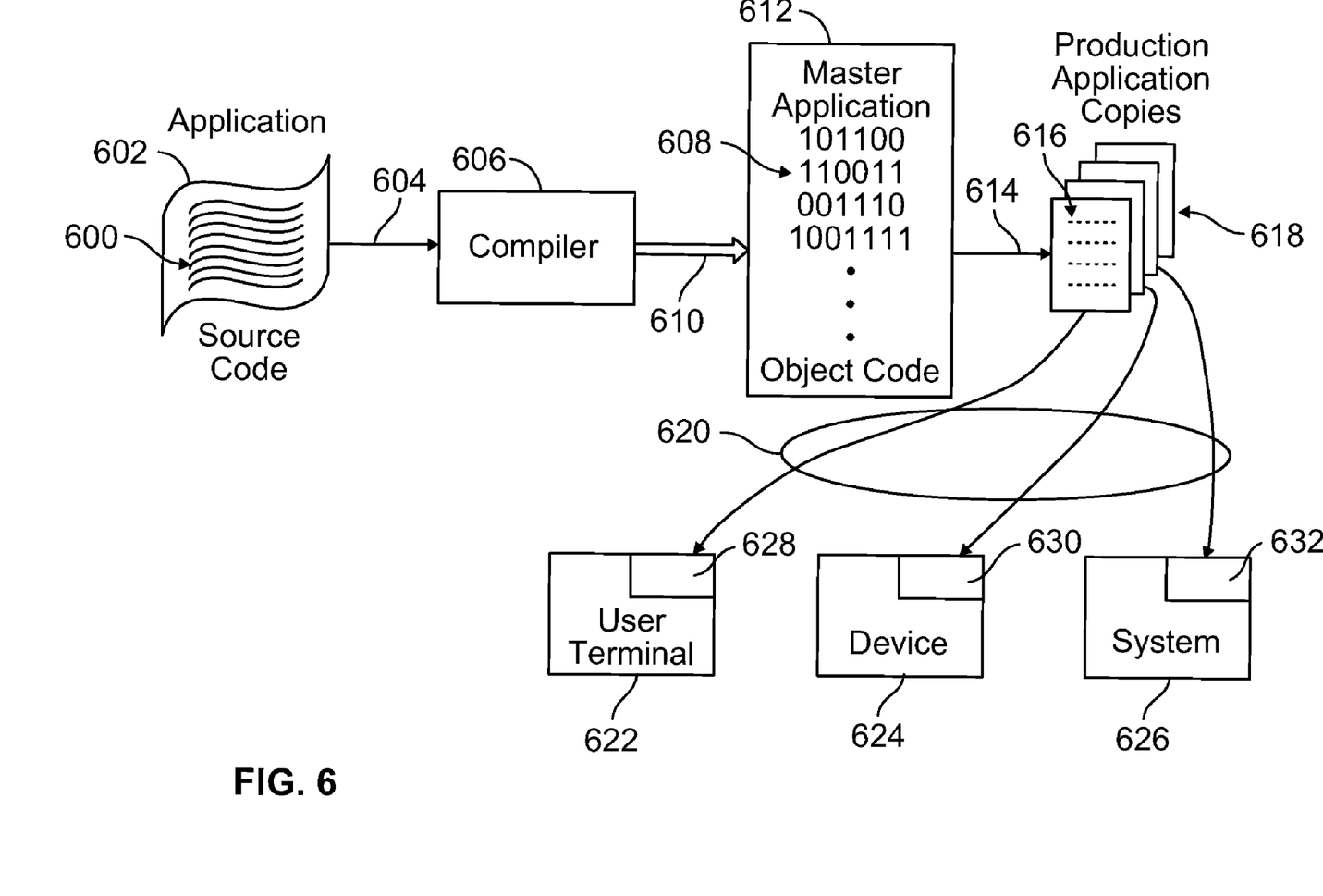
FIG. 6 illustrates a block diagram of exemplary manners in which embodiments of the present invention may be stored, distributed and installed on a computer-readable medium.

FIG. 6 illustrates a block diagram of exemplary manners in which embodiments of the present invention may be stored, distributed and installed on a computer-readable medium. In FIG. 6, the "application" represents one or more of the methods and process operations discussed above. For example, the application may represent the processes carried out in connection with FIGS. 1 through 5 as discussed above. As shown in FIG. 6, the application is initially generated and stored as source code 600 on a source computer-readable medium 602. The source code 600 is then conveyed over path 604 and processed by a compiler 606 to produce object code 608. The object code 608 is conveyed over path 610 and saved as one or more application masters on a master computer-readable medium 612. The object code 608 is then copied numerous times, as denoted by path 614, to produce production application copies 616 that are saved on separate production computer-readable medium 618. The production computer-readable medium 618 is then conveyed, as denoted by path 620, to various systems, devices, terminals and the like. In the example of FIG. 6, a user terminal 622, a device 624 and a system 626 are shown as examples of hardware components, on which the production computer-readable medium 618 are installed as applications (as denoted by 628 through 632). For example, the production computer-readable medium 618 may be installed on the monitoring module 106 (shown in FIG. 1), the microcontroller 508 (shown in FIG. 5) and/or the memory 516 (shown in FIG. 5).

The source code may be written as scripts, or in any high-level or low-level language. Examples of the source, master, and production computer-readable medium 602, 612 and 618 include, but are not limited to, CDROM, RAM, ROM. Flash memory, RAID drives, memory on a computer system and the like. Examples of the paths 604, 610, 614, and 620 include, but are not limited to, network paths, the internet, Bluetooth, GSM, infrared wireless LANs, HIPERLAN, 3G, satellite, and the like. The paths 604, 610, 614, and 620 may also represent public or private carrier services that transport one or more physical copies of the source, master, or production computer-readable medium 602, 612 or 618 between two geographic locations. The paths 604, 610, 614 and 620 may represent threads carried out by one or more processors in parallel. For example, one computer may hold the source code 600, compiler 606 and object code 608. Multiple computers may operate in parallel to produce the production application copies 616. The paths 604, 610, 614, and 620 may be intra-state, inter-state, intra-country, inter-country, intra-continental, inter-continental and the like.

The operations noted in FIG. 6 may be performed in a widely distributed manner world-wide with only a portion thereof being performed in the United States. For example, the application source code 600 may be written in the United States and saved on a source computer-readable medium 602 in the United States, but transported to another country (corresponding to path 604) before compiling, copying and installation. Alternatively, the application source code 600 may be written in or outside of the United States, compiled at a compiler 606 located in the United States and saved on a master computer-readable medium 612 in the United States, but the object code 608 transported to another country (corresponding to path 614) before copying and installation. Alternatively, the application source code 600 and object code 608 may be produced in or outside of the United States, but production application copies 616 produced in or conveyed to the United States (for example, as part of a staging operation) before the production application copies 616 are installed on user terminals 622, devices 624, and/or systems 626 located in or outside the United States as applications 628 through 632.

As used throughout the specification and claims, the phrases "computer-readable medium" and "instructions configured to" shall refer to any one or all of (i) the source computer-readable medium 602 and source code 600, (ii) the master computer-readable medium and object code 608, (iii) the production computer-readable medium 618 and production application copies 616 and/or (iv) the applications 628 through 632 saved in memory in the terminal 622, device 624 and system 626.

What is claimed is:

1. A method for determining a service life of a filter, the method comprising:
obtaining exposure data from a sensor, the exposure data representative of one or more ambient conditions to which the filter currently is exposed;
calculating a service life estimate based on the exposure data, the service life estimate representative of an estimated time period that the filter can be exposed to the ambient conditions to which the filter currently is exposed before a contaminant passes through the filter at a breakthrough concentration; obtaining environmental data from an input that differs from the sensor, the environmental data including at least one of a previous condition to which the filter has been exposed and an expected condition to which the filter is exposed;
establishing a service life prediction based on the environmental data, the service life prediction representative of a predicted time period that the filter can be exposed to conditions represented by the environmental data before the contaminant passes through the filter at the breakthrough concentration; and
using a computer processor for determining a service life of the filter based on a comparison of the service life estimate and the service life prediction.

2. The method of claim 1, wherein the service life is representative of a time period that the filter prevents the contaminant from passing through the filter at a concentration greater than the breakthrough concentration.

3. The method of claim 1, further comprising calculating a residual life indicator and an end of service life (ESL) indicator based on the comparison of the service life estimate and the service life prediction, the residual life indicator representative of a remaining time period during which the filter is exposed to the ambient conditions before the contaminant passes through the filter at a concentration that is at least as great as the breakthrough concentration, the ESL indicator representative of a total time period during which the filter has been exposed to the ambient conditions, wherein the determining operation comprises determining the service life of the filter based on a comparison of the residual life indicator and the ESL indicator.

4. The method of claim 3, wherein the determining operation comprises determining which of the residual life indicator and the ESL indicator provides a shorter service life for the filter and basing the service life thereon.

5. The method of claim 1, further comprising measuring an exposure time representative of a total amount of time that the filter has been exposed to the ambient conditions; and notifying an operator of the filter when the exposure time measured by the timer meets or exceeds the service life for the filter.

6. The method of claim 1, wherein the exposure data comprises one or more of a water concentration, a pressure, a temperature, or a contaminant concentration to which the filter is exposed.

7. The method of claim 1, wherein the environmental data comprises one or more of a previous ambient condition to which the filter previously was exposed, a work rate representative of an expected air flow through the filter, a concentration of the contaminant that the filter previously was exposed, an identity of the contaminant to which the filter will be exposed, a previous summed contaminant exposure representative of a total amount of the contaminant to which the filter previously has been exposed, or a respirator type representative of an air purifying respirator within which the filter will be disposed.

8. The method of claim 1, wherein the obtaining operation comprises obtaining the environmental data prior to exposing the filter to the ambient conditions represented by the exposure data.

9. The method of claim 1, further comprising dynamically updating the exposure data from the sensor while the filter is exposed to the ambient conditions and dynamically updating the service life by comparing the service life prediction with the service life estimate that is dynamically updated.

10. The method of claim 1, wherein the obtaining operation comprises an operator of the filter providing the environmental data to the input.

11. A non-transitory computer readable medium comprising computer instructions stored therein for causing a computer processor to perform:
receiving exposure data and environmental data, the exposure data representative of one or more ambient conditions to which a filter currently is exposed, the environmental data representative of at least one of a previous condition to which the filter previously was exposed or an expected condition to which the filter is exposed;
calculating a service life estimate based on the exposure data and a service life prediction based on the environmental data, the service life estimate representative of an estimated time period that the filter can be exposed to the ambient conditions to which the filter currently is exposed before a contaminant passes through the filter at a breakthrough concentration, the service life prediction representative of a predicted time period that the filter is can be exposed to conditions represented by the environmental data before the contaminant passes through the filter at the breakthrough concentration; and
determining a service life for the filter based on a comparison of the service life prediction and the service life estimate.

12. The computer readable medium of claim 11, wherein the instructions cause the computer processor to perform: calculating a residual life indicator based on the comparison of the service life prediction and the service life estimate, the residual life indicator representative of a remaining time period during which the filter can continue to be exposed to the ambient conditions before the contaminant passes through the filter at a concentration that is at least as great as the breakthrough concentration.

13. The computer readable medium of claim 11, wherein the instructions cause the computer processor to perform:

calculating an end of service life (ESL) indicator based on the comparison of the service life prediction and the service life estimate, the ESL indicator representative of a total time period during which the filter has been exposed to the ambient conditions.

14. The computer readable medium of claim 11, wherein the instructions cause the computer processor to perform: calculating a residual life indicator and an end of service life (ESL) indicator based on the comparison of the service life prediction and the service life estimate, the residual life indicator representative of a remaining time period during which the filter can continue to be exposed to the ambient conditions before the contaminant passes through the filter at a concentration that is at least as great as the breakthrough concentration, the ESL indicator representative of a total time period during which the filter has been exposed to the ambient conditions, wherein the instructions for determining comprise instructions for determining the service life of the filter based on a comparison of the residual life indicator and the ESL indicator.

15. The computer readable medium of claim 14, wherein the instructions cause the computer processor to perform: determining which of the residual life indicator and the ESL indicator provides a shorter service life and basing the service life thereon.

16. The computer readable medium of claim 11, wherein the instructions cause the computer processor to perform: receiving an exposure time from a timer, the exposure time representative of a total amount of time that the filter has been exposed to the ambient conditions; and notifying an operator of the filter when the exposure time measured by the timer meets or exceeds the service life for the filter.

17. The computer readable medium of claim 11, wherein the exposure data comprises one or more of a water concentration, a pressure, and a temperature to which the filter is exposed while filtering the contaminant.

18. The computer readable medium of claim 11, wherein the environmental data comprises one or more of an ambient pressure, an ambient temperature, an ambient water concentration, a work rate representative of a flow of air through the filter, an ambient chemical contaminant concentration, an identity of the chemical contaminant, a previous chemical contaminant exposure representative of a total amount of the chemical contaminant to which the filter previously has been exposed, a previous humidity exposure representative of a total amount of water to which the filter previously has been exposed, and a respirator type representative of an air purifying respirator within which the filter is disposed.

19. The computer readable medium of claim 11, wherein the instructions cause the computer processor to perform: receiving the exposure data from a sensor and receiving the environmental data from an input that differs from the sensor.

20. The computer readable medium of claim 11, wherein the instructions cause the computer processor to perform: dynamically updating the exposure data while the filter is exposed to the ambient conditions and dynamically updating the service life by comparing the service life prediction with the service life estimate that is dynamically updated.

21. A system for determining a service life for a filter, the system comprising:
a filter configured to be coupled to an air purifying respirator to filter a contaminant;
a filter sensor disposed proximate to the filter to measure exposure data; and
a monitoring module, when executed by a computer processor, operable to receive the exposure data from the sensor and environmental data from an input that differs from the sensor, wherein the monitoring module is configured to:
calculate a service life estimate based on the exposure data, the service life estimate representative of an estimated time that the filter is exposed to ambient conditions before the contaminant passes through the filter at a breakthrough concentration;
establish a service life prediction based on the environmental data, the service life prediction representative of a predicted total exposure time that the filter is exposed to the ambient conditions before the contaminant passes through the filter at the breakthrough concentration;
calculate a residual life indicator and an end of service life (ESL) indicator based on a comparison of the service life prediction and the service life estimate, the residual life indicator representative of a remaining time period during which the filter is exposed to the ambient conditions before the contaminant passes through the filter at the breakthrough concentration, the ESL indicator representative of a total time period during which the filter has been exposed to the ambient conditions; and
determine the service life for the filter based on a comparison of the residual life indicator and the ESL indicator.

22. The system of claim 21, wherein the service life is representative of a time period that the filter is exposed to the contaminant before the contaminant passes through the filter at the breakthrough concentration.

23. The system of claim 21, wherein the exposure data is representative of ambient conditions to which the filter is exposed and includes a contaminant concentration.

24. The system of claim 21, wherein the environmental data is representative of at least one of the ambient conditions.

25. The system of claim 21, wherein each of the residual life indicator and the ESL indicator is calculated by comparing the service life prediction and the service life estimate.

26. The system of claim 21, wherein the sensor is a plenum sensor disposed between two adsorbent beds in the filter.

27. The system of claim 21, wherein the monitoring module dynamically updates the exposure data from the sensor while the filter is exposed to the ambient conditions and dynamically updates the service life by comparing the service life prediction with the service life estimate that is dynamically updated.

28. The system of claim 21, wherein the monitoring module receives the environmental data from an operator that provides the environmental data to the input.

29. The system of claim 21, wherein the environmental data comprises one or more of a previous ambient condition to which the filter previously was exposed, a work rate representative of an expected air flow through the filter, a concentration of the contaminant that the filter previously was exposed, an identity of the contaminant to which the filter will be exposed, a previous summed contaminant exposure representative of a total amount of the contaminant to which the filter previously has been exposed, or a respirator type representative of an air purifying respirator within which the filter will be disposed.

* * * * *

UNITED STATES PATENT AND TRADEMARK OFFICE
CERTIFICATE OF CORRECTION

| | | |
|---|---|---|
| PATENT NO. | : 7,860,662 B2 | Page 1 of 1 |
| APPLICATION NO. | : 12/336920 | |
| DATED | : December 28, 2010 | |
| INVENTOR(S) | : Michael Parham and Yuqing Ding | |

It is certified that error appears in the above-identified patent and that said Letters Patent is hereby corrected as shown below:

Section (75), second line, Inventor: Yuquing Ding, after the "q", delete "u", therefor.

Signed and Sealed this
Twenty-second Day of February, 2011

David J. Kappos
*Director of the United States Patent and Trademark Office*